United States Patent [19]

Bürge et al.

[11] Patent Number: 4,501,839

[45] Date of Patent: Feb. 26, 1985

[54] METHOD OF USING HIGHLY CONCENTRATED AQUEOUS SOLUTIONS OF LOW VISCOSITY OF MELAMINE/ALDEHYDE RESINS FOR IMPROVING BUILDING MATERIALS

[75] Inventors: Theodor A. Bürge, Geroldswil; Jürg Widmer, Zurich; Theodor Meyer, Regensdorf; Ulrich Sulser, Oberengstringen, all of Switzerland

[73] Assignee: Sika AG, vorm. Kaspar Winkler & Co., Zurich, Switzerland

[21] Appl. No.: 561,328

[22] Filed: Dec. 14, 1983

[30] Foreign Application Priority Data

Mar. 2, 1981 [DE] Fed. Rep. of Germany ....... 3107852

[51] Int. Cl.³ .............................................. C08L 61/28
[52] U.S. Cl. .................................... 524/247; 106/90; 524/6; 524/249; 524/401; 524/428; 524/430; 524/437; 524/598; 524/650; 524/843
[58] Field of Search .................. 106/90; 524/247, 6, 524/650, 598

[56] References Cited

U.S. PATENT DOCUMENT 3,985,695  10/1976  Aigmesbger ................ 524/843

FOREIGN PATENT DOCUMENTS 2,505,578  11/1976  Fed. Rep. of Germany.
7,209,989   2/1973  Netherlands ................ 524/598

*Primary Examiner*—Theodore E. Pertilla
*Attorney, Agent, or Firm*—Abelman, Frayne, Rezac & Schwab

[57] ABSTRACT

Highly concentrated aqueous solutions of low viscosity of melamine/aldehyde resins are obtained by reacting to a precondensate in a first step melamine and an aldehyde in an alkaline medium and in the presence of water together with at least one compound (I), selected from the group, consisting of an alkali sulfite, an alkaline earth sulfite, an amino sulfonic acid, an amino carboxylic acid, a hydroxycarboxylic acid, a hydroxycarboxylic acid lactone, and a polyhydroxy carboxylic acid lactone, reacting then the thus obtained mixture in a second step with at least one compound (II), selected from the group, consisting of an amino carboxylic acid, a carboxylic acid, a hydroxy carboxylic acid, a hydroxy carboxylic acid lactone, a sulfamic acid, an amino sulfonic acid, a polyhydroxy carboxylic acid and a polyhydroxy carboxylic acid lactone, and then making alkaline the obtained resin solution by adding at least one basic compound (III). The resin solutions prepared according to this invention may be used as added substances for improving the quality of building materials containing inorganic binders.

21 Claims, No Drawings

METHOD OF USING HIGHLY CONCENTRATED AQUEOUS SOLUTIONS OF LOW VISCOSITY OF MELAMINE/ALDEHYDE RESINS FOR IMPROVING BUILDING MATERIALS

This is a division of application Ser. No. 351,915, filed Feb. 24, 1982, now U.S. Pat. No. 4,430,469, published Feb. 7, 1984.

FIELD OF THE INVENTION

The present invention relates to a process for preparing highly concentrated aqueous solutions of low viscosity of melamine/aldehyde resins.

DESCRIPTION OF THE PRIOR ART

It is known from the German Pat. No. 1 671 017 to use sulfite- or sulfonic acids-modified resins on the basis of an amino-S-triazine with at least two $NH_2$-groups for the improvement of the quality of building materials prepared of inorganic binding agents. But these resins possess considerable disadvantages, which are mentioned partly in the German Pat. No. 2 359 291. For example, solutions of low viscosity on the basis of an amino-S-triazine may only be prepared with a solids content up to 20% of weight.

Beside the preparation of conventional sulfite modified melamine/formaldehyde resins there is also described in the German Pat. No. 1 671 017 a process for preparing higher concentrated solutions of polycondensation products, and in this process are used N-sulfonated melamines, such as e.g. N-monosulfonated acetoguanamine and N-sulfonated benzoguanamine, instead of the melamine. But first of all, these sulfonic acid derivatives must be synthesized and isolated. Therefore, these derivatives are hardly available and did not find any use in the practice. According to the German Pat. No. 1 671 017 the mentioned resins containing N-sulfonated melamines show as a disadvantage for many applications a too high viscosity. Therefore, it is necessary to dilute previously such conventionally prepared solutions of resins which are usually transported with the aid of metering pumps through long lines to the processing location, whereby several advantages are lost, which are common to highly concentrated solutions.

According to these known processes mineral acids are used to obtain the pH value below 4.5 necessary for the polycondensation. By using hydrochloric acid there would be expected a risk of corrosion by the chloride ion. By using phosphoric acid there would be expected a large retardation of the setting time. Therefore, in the practice one uses always sulfuric acid. This causes that the sulfates contained in the end product must be separated. Usually this is done by crystallization at low temperature and separating according to conventional methods.

However, a certain portion of sulfate remains in the end product and makes it impossible to mix this product with e.g. calcium salts of the lignin sulfonic acids or with the calcium salts of sulfonated naphthalene/formaldehyde polycondensation products, since therewith insoluble calcium sulfate is precipitated.

In the Swiss Pat. No. 602 809 it is suggested to use the melamine mixed with up to 40 Mol percent of urea in order to obtain solutions of low viscosity. But this presumes that the condensation is carried out in a time-consuming multistage process.

A further disadvantage of these conventionally prepared melamine resins is demonstrated at the practical use. Concrete or mortar containing these already known resins in general show a relatively quick retrogression of the workability. For example, the fluency and the readiness of compression get lost and usually the pumpability becomes impossible.

According to scheme 1 it is known that commercial water soluble melamine/formaldehyde resins may be prepared by reacting melamine 1 in a first step (see scheme 1) at pH values within the range of 9 and 12 with formaldehyde and alkali sulfite at temperatures from 70° to 90° C. in order to obtain a precondensate.

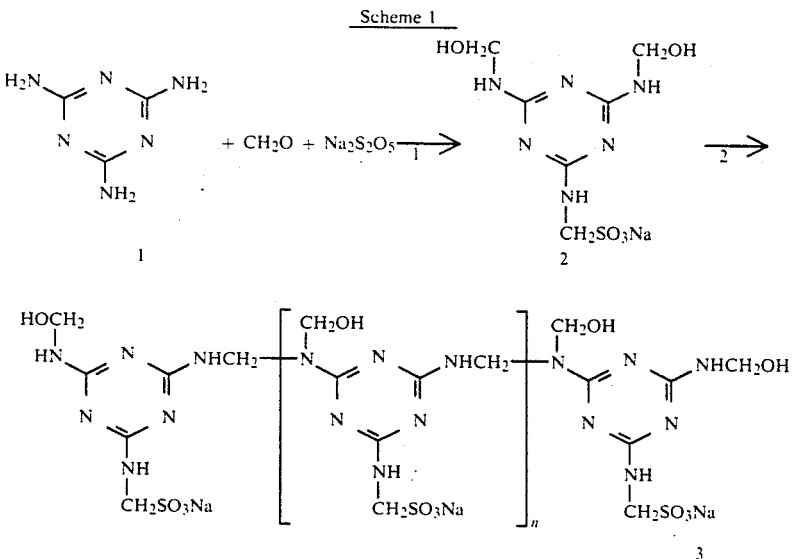

Scheme 1

This precondensate consists of a mixture of partially sulfonated methylol compounds of e.g. the type 2 (scheme 1). The degree of methylolization depends on the molar ratio of formaldehyde to melamine. In a second step there is then carried out in the presence of mineral acids at pH values between 1.5 and 4.5 and at temperatures between 40° C. and 60° C. the polycondensation reaction of the product of the type 2 to the product of the type 3, which is then in a third step kept for 1 to 2 hours at pH values between 8 and 9 and a temperature from 80° to 90° C. for increasing the storage stability.

The so prepared resin solutions have different viscosities defining the performance characteristics depending on the used reaction conditions in step 2. Therefore, it is possible to obtain, e.g. at suitable selected mild conditions solutions of resins having a solids content of 40% and a viscosity range from 500 to 1000 centipoise.

According to our knowledge there are not known processes for preparing resin solutions having a concentration of 40% together with an extreme low viscosity range, e.g. from 30 to 60 centipoise or resin solutions having a concentration from 45 to 50% together with viscosities below 250 centipoise. The high viscosities which are unsuitable by using such resins in building materials are usually due to the fact that the methylol groups attached to the resin (3, see scheme 1) may additionally enter into combination with unwanted cross linking reactions.

SUMMARY OF THE INVENTION

Hence, it is a general object of the present invention to overcome the above mentioned disadvantages by a simple and economically suitable manner.

DETAILED DESCRIPTION OF THE INVENTION

The process of this invention for preparing highly concentrated aqueous solutions of low viscosity of melamine/aldehyde resins is characterized by reacting to a precondensate in a first step melamine and an aldehyde in an alkaline medium and in the presence of water together with at least one compound (I), selected from the group, consisting of an alkali sulfite, an alkaline earth sulfite, an an amino sulfonic acid, an amino acid, an amino carboxylic acid, an amino dicarboxylic acid, a hydroxycarboxylic acid, a hydroxycarboxylic acid lactone, and a polyhydroxy carboxylic acid lactone reacting then the so obtained mixture in a second step with at least one compound (II), selected from the group, consisting of an amino acid, an amino carboxylic acid, an amino dicarboxylic acid, a carboxylic acid, a hydroxy carboxylic acid, a hydroxy carboxylic acid lactone, a sulfamic acid, an amino sulfonic acid, a polyhydroxy carboxylic acid and a polyhydroxy carboxylic acid lactone, and then making alkaline the obtained resin solution by adding at least one basic compound (III).

The final characteristics of the resin solutions prepared according to the process of this invention may be controlled within wide ranges.

The resin solutions may be used as added substances in building materials containing inorganic binding materials.

In the first step of the process of this invention formaldehyde is preferably used as aldehyde. In the process of this invention formaldehyde may be used as gas, in the form of solutions, preferably in the form of aqueous solutions, or as a solid (e.g. paraformaldehyde).

In a preferred embodiment, the molar ratio of the melamine, the aldehyde and the compound (I) used in the first step is 1:3.5 to 6:0.5 to 1.

In a preferred embodiment the first step reaction is conducted at a pH of from 9.0 to 13.0.

The first step of the process of this invention is preferably carried out at temperatures from 75° C. to 100° C.

For example in water, in general the melamine dissolves poorly below temperatures of 75° C. When working at higher temperatures the exothermal reaction is usually so fast that insoluble resins may occur.

For example, one advantage of the process of this invention consists therein, that the reaction in the first step is terminated within 15 minutes, which is an improvement over the prior art; see for example the German Pat. Nos. 1 671 017 and 2 359 291.

The compounds (II) in the second step of the process of this invention serve as modifiers which in general are capable of reacting with a part of the methylol- and amino groups which are responsible for the additional cross linkage, whereby these groups are blocked.

In a preferred embodiment, the condensate from the first step of the reaction and the compound (II) are in a molar ratio of from 1:0.1 to 3, relative to the melamine used in the first step.

Contrary to the processes of the prior art it is possible to carry out the second step of the process of this invention at high pH values within the range from 5.5 to 7.0. In that way the possibility rises to renounce the usual use of mineral acids, whereby an improvement of the performance characteristics of the resin solutions prepared according to this invention is obtained.

By carrying out the second step of the process of this invention at a lower pH value, e.g. at 4.5, then the reaction is in general too fast in the preferred temperature range from 75° C. to 100° C., so that it is possible that insoluble solid resins may be formed.

But it is also possible to carry out the second step of the process of this invention at lower temperature, e.g. at ambient temperature, and at a lower pH value, e.g. at a pH value of 4.5, but this embodiment of the process of this invention is not preferred.

The solutions of melamine/aldehyde resins prepared according to this invention may either be diluted or concentrated; especially it is possible to spray dry them and to redissolve them at a later moment.

Usually the process of this invention is carried out at ambient pressure. It is obvious for those skilled in the art that it is possible to carry out the process of this invention at excess pressure and at under pressure (vacuum).

In a preferred embodiment, the resulting aqueous solutions which are prepared have a solids content of from 30 to 50% by weight and a viscosity of from 5 to 250 centipoise.

The solutions prepared according to the process of this invention contain in general less than 0.1% of weight of sulfate, which is an improvement over the prior art.

A further advantage to be mentioned over the known amino-S-triazine resins consists therein, that the resin solutions prepared according to this invention may also be obtained fully alkaline free, e.g. as salts of multivalent cations. Therewith the alkali aggregate reaction may be reduced; this reaction between alkalies and certain silicatic additives results in propellant phenomenons giving rise to destroying the inorganic building material.

Basic compound (III) is selected from the group consisting of an alkali hydroxide, an alkaline earth oxide, an alkaline earth hydroxide, ammonium hydroxide, a monoamine, a polyamine, monoethanol amine, diethanol amine, triethanol amine and a basic compound of a transition metal.

In general alumina- or ethanolamine salts accelerate and zinc salts retard the setting of the hydraulic binder.

For example, the workability of fresh concrete and the mechanical characteristics of the hardened concrete are improved by using the solutions of melamine/aldehyde resins prepared according to the process of this invention. In this connection see e.g. "Superplasticizers in Concrete", Volume I and Volume II, Proceeding of an International Symposium, held in Ottawa, Canada, May 29-31, 1978, published by V. M. Malhotra, E. E. Berry and T. A. Wheat and the references cited therein.

The solutions of melamine/aldehyde resin prepared according to the process of this invention may be used as additive to building materials containing inorganic binders, e.g. cement, limestone and gypsum, preferably in amounts from 0.01 to 25% by weight, relative to the weight of the inorganic binder.

The following examples illustrate this invention.

EXAMPLE 1

To a solution consisting of 130 parts per weight (1.6 mol) 37% formaline, 120 parts per weight water and 43.4 parts per weight sodium hydroxide was added successively 44.6 parts per weight (0.48 mol) sulfamic acid and 56 parts per weight (0.44 mol) melamine. Then the temperature was raised to 80° C. and then the mixture was stirred for 60 minutes at this temperature. Then was added to the precondensate 2.6 parts per weight 50% sodium hydroxide followed by 19 parts per weight (0.1 mol) sulfanile acid, whereby the pH value decreased to 5.9. The reaction mixture was then kept during one hour at a temperature of 80° C. and then a pH value of 10.1 was adjusted by adding sodium hydroxide and the mixture was cooled to room temperature. There was obtained a clear, colorless solution of polymers having a dry content of 41% and a viscosity of 37 centipoise (Brookfield Rot. viscosimeter).

EXAMPLE 2

To a precondensate prepared according to Example 1, were added 2 parts per weight 50% sodium hydroxide and then 20 parts per weight glutamic acid. The solution having a pH value of 6.0 was kept during 60 minutes at a temperature of 80° C. Then by adding sodium hydroxide a pH value of 10.0 was adjusted and it was cooled to a temperature of 20° C. It was obtained a colorless, clear solution of polymers having a solids content of 41.5 and a viscosity of 55 centipoise.

EXAMPLE 3

To a suspension consisting of 260 parts per weight 37% (3.2 mol) formaline, 260 parts per weight water, 10 parts per weight calcium oxide and 112 parts per weight melamine, was passed under stirring at a temperature of 80° C. a vigorous stream of sulfur dioxide until a clear solution was obtained. Then stirring was continued for 30 minutes at a temperature of 80° C. and then there were added to the solution 28 parts per weight (0.28 mol) sulfamic acid, and a pH value of 5.9 was measured. Then the reaction solution was kept during 75 minutes at a temperature of 85° C. and then a pH value of 9.5 was adjusted by adding 9 parts per weight calcium oxide. After cooling to room temperature, a clear, colorless solution of the calcium salt having a solids content of 40% and a viscosity of 43 centipoise was obtained.

By reacting the calcium salt of the polymer solution with slightly soluble sulfates and separating the precipitated gypsum, salts of multivalent cations, e.g. alumina or zinc, may be prepared.

EXAMPLE 4

A mixture of 650 parts per weight (8.02 mol) 37% formaline in 650 parts per weight water was adjusted to a pH value of 10.1 by adding sodium hydroxide, and then were added successively to this mixture 280 parts per weight (2.22 mol) melamine and 224 parts per weight (1.18 mol) sodium pyrosulfite. Then this was heated to a temperature of 80° C., and the clear solution was kept at this temperature during 45 minutes. Then to this mixture 25 parts per weight 50% sodium hydroxide were dropped, and then were added successively 45 parts per weight sulfamic acid and 45 parts per weight glutamic acid. The clear reaction solution having a pH value of 5.8 was then kept at a temperature of 85° C. during 60 minutes, and then by adding sodium hydroxide a pH value of 10.0 was adjusted. After cooling to room temperature a clear, colorless solution having a solids content of 40% and a viscosity of 51 centipoise was obtained.

EXAMPLE 5

In a mixture of 325 parts per weight (4.0 mol) 37% formaline in 220 parts per weight water was adjusted a pH value of 10.0 by adding sodium hydroxide, and then were added to this mixture 112 parts per weight (0.88 mol) melamine and 89.6 parts per weight (0.48 mol) sodium pyrosulfite, and this mixture was kept at a temperature of 80° C. during 30 minutes. This solution was adjusted to a pH value of 5.9 by adding 10 parts per weight 80% lactic acid and during one hour was stirred at a temperature of 75° C. By adding sodium hydroxide a pH value of 10.2 was then adjusted. It was obtained a colorless, clear polymer solution having a solids content of 40% and a viscosity of 50 centipoise.

EXAMPLE 6

In a mixture of 130 parts per weight (1.60 mol) 37% formaline and 130 parts per weight water, was adjusted a pH value of 10,0 by adding sodium hydroxide. To this mixture were added 56 parts per weight (0.44 mol) melamine and 44.8 parts per weight (0.24 mol) sodium pyrosulfite, and the mixture was heated to a temperature of 80° C., resulting in a clear solution. Then this mixture was stirred during 30 minutes at a temperature of 80° C., and then was adjusted a pH value of 11.0 by adding sodium hydroxide. Then were added 14 parts per weight (0.14 mol) sulfamic acid, and the solution having a pH value of 5.9 was kept at a temperature of 85° C. during 75 minutes. Then was adjusted a pH value of 10.3 by adding sodium hydroxide, followed by cooling to room temperature. There was obtained a clear, colorless resin solution having a solids content of 40.7% and a viscosity of 34 centipoise (Brookfield Rotationviscosimeter, 20 revolutions per minute, Spindle 1).

EXAMPLE 7

A solution consisting of 260 parts per weight (3.20 mol) 37% formaline and 130 parts per weight water was adjusted to a pH value of 10.0 by adding sodium hydroxide, and then were added 112 parts per weight (0.88 mol) melamine and 90 parts per weight (0.49 mol) sodium pyrosulfite. Then this mixture was heated to a temperature of 80° C. and this temperature was kept during 45 minutes. Then there were added 20 parts per weight 50% sodium hydroxide and 42 parts per weight (0.44 mol) sulfamic acid, resulting in a decrease of the pH value to 5.6. Then this mixture was condensed during 30 minutes at a temperature of 80° C., and then a pH value of 9.7 was adjusted by adding sodium hydroxide and the mixture was cooled to room temperature.

A clear, colorless polymer solution was obtained having a solids content of 50% and a viscosity of 210 centipoise (Brookfield Rot. Viscosimeter).

EXAMPLE 8

To a mixture of 650 parts per weight 37% formaline in 600 parts per weight water were added successively 25 parts per weight 50% sodium hydroxide, 280 parts per weight melamine and 224 parts per weight sodium pyrosulfite, whereby the temperature rose to 45° C. The suspension was heated to a temperature of 80° C. within 15 minutes, and the obtained clear solution was kept at this temperature for 45 minutes. Then this solution was cooled to a temperature of 75° C., and to this solution were added 35 parts per weight gluconic acid-δ-lactone. Thereby the pH value of pH=10.85 decreased to pH=6.45. Then the reaction mixture was stirred at a temperature of 75° C. during 120 minutes and then were added 12.5 parts per weight 50% sodium hydroxide and the mixture was cooled to room temperature. There was obtained a clear, colorless resin solution having a solids content of 40% and a viscosity of 43 centipoise.

In the following tables are contained test results of the solutions of melamine/formaldehyde resins prepared according to this invention.

A. Standard mortar flow test

Mortar mixture consisting of 1 part per weight Portland cement and 3 parts per weight sand.
 Cement:PC according to SIA Standard 215
 Sand:0-5 mm grain size

TABLE 1

| Additive according to the example | Dosage* % | W/Z | Flattening out mm after minutes | | | | |
|---|---|---|---|---|---|---|---|
| | | | 5 | 15 | 30 | 45 | 60 |
| without | — | 0.51 | 185 | 182 | 173 | 165 | 160 |
| 1 | 1 | 0.48 | 197 | 181 | 169 | 156 | 148 |
| 4 | 1 | 0.48 | 205 | 197 | 180 | 165 | 150 |
| 5 | 1 | 0.48 | 187 | 175 | 163 | 154 | 143 |
| 6 | 1 | 0.48 | 196 | 183 | 172 | 160 | 150 |
| 7 | 1 | 0.48 | 220 | 196 | 181 | 162 | 154 |

*relative to the inorganic binder

B. Experiments with Concrete

| Mixture of concrete | |
|---|---|
| Added substances: | 0-32 mm sieve curve according to SIA Standard 162 |
| Cement: | PC SIA Standard 215 |
| Cement content: | 300 kg/m³ |
| Added substance: | according to the examples |
| Blender: | constraint blender type EIRICH |
| Preparation of the concrete: | Additives and cement were mixed in dry condition during one minute, and then water was added with the added substance dissolved therein, followed by mixing during 2 further minutes. |

TABLE 2

| | Added substance according to the examples | | | | | |
|---|---|---|---|---|---|---|
| | without | 1 | 2 | 5 | 6 | 7 |
| Dosage % | — | 1.0 | 1.0 | 1.0 | 1.0 | 1.0 |
| Mixing temperature °C. | 17.0 | 17.5 | 17.5 | 17.5 | 17.0 | 17.5 |
| W/Z | 0.57 | 0.45 | 0.45 | 0.45 | 0.45 | 0.45 |
| Flattening out (cm) | 41 | 30 | 34 | 30 | 35 | 30 |
| Density (kg/l) | 2.412 | 2.450 | 2.462 | 2.462 | 2.443 | 2.456 |
| Air % | 0.8 | 1.4 | 1.1 | 1.2 | 1.5 | 1.3 |
| Compression elasticities: | | | | | | |
| 1 day % | 100 | 279.7 | 244.5 | 279.3 | 257.0 | 326.7 |
| N/mm2 | 4.79 | 13.4 | 11.71 | 13.38 | 12.31 | 15.65 |
| 7 days % | 100 | 190.5 | 179.0 | 190.2 | 183.5 | 185.3 |
| N/mm2 | 19.95 | 38.0 | 35.72 | 37.94 | 36.6 | 36.97 |
| 21 days % | 100 | 155.8 | 151.8 | 153.6 | 160.3 | 154.8 |
| N/mm2 | 27.75 | 43.24 | 42.13 | 42.62 | 44.49 | 42.96 |
| 35 days % | 100 | 152.6 | 148.1 | 152.0 | 148.4 | 150.5 |
| N/mm2 | 30.3 | 46.09 | 44.72 | 45.9 | 44.81 | 45.46 |

TABLE 3

| | Added substance according to the examples | | | | | |
|---|---|---|---|---|---|---|
| | without | 1 | 2 | 5 | 6 | 7 |
| Dosage % | — | 2.0 | 2.0 | 2.0 | 2.0 | 2.0 |
| Mixing temperature °C. | 17.0 | 17.5 | 17.5 | 18.0 | 18.0 | 17.5 |
| W/Z | 0.57 | 0.425 | 0.425 | 0.425 | 0.425 | 0.425 |
| Flattening out (cm) | 40 | 32 | 37 | 34 | 47 | 44 |
| Density (kg/l) | 2.418 | 2.468 | 2.468 | 2.468 | 2.437 | 2.475 |
| Air % | 0.7 | 0.8 | 0.9 | 1.1 | 1.8 | 0.8 |
| Compression elasticities: | | | | | | |
| 1 day % | 100 | 445.0 | 394.1 | 432.3 | 357.1 | 482.5 |
| N/mm2 | 4.24 | 18.87 | 16.71 | 18.33 | 15.14 | 20.46 |
| 7 days % | 100 | 233.5 | 224.6 | 219.5 | 223.0 | 227.2 |
| N/mm2 | 19.6 | 43.8 | 44.03 | 43.03 | 43.7 | 44.54 |
| 21 days % | 100 | 192.2 | 190.4 | 187.8 | 184.5 | 198.4 |
| N/mm2 | 26.13 | 50.23 | 49.75 | 49.07 | 48.22 | 51.85 |
| 35 days % | 100 | 181.0 | 185.1 | 180.0 | 180.6 | 185.7 |
| N/mm2 | 28.0 | 50.69 | 51.83 | 50.39 | 50.58 | 51.99 |

TABLE 4

| | Added substance according to the examples | | | | | |
|---|---|---|---|---|---|---|
| | without | 1 | 2 | 5 | 6 | 7 |
| Dosage % | — | 3.0 | 3.0 | 3.0 | 3.0 | 3.0 |
| Mixing temperature° C. | 17.5 | 17.5 | 18.0 | 18.0 | 18.0 | 18.0 |
| W/Z | 0.57 | 0.41 | 0.41 | 0.41 | 0.41 | 0.41 |
| Flattening out (cm) | 44 | 30 | 30 | 30 | 46 | 33 |
| Density (kg/l) | 2.418 | 2.481 | 2.475 | 2.468 | 2.431 | 2.481 |
| Air % | 0.6 | 0.8 | 0.6 | 1.0 | 1.5 | 0.6 |
| Compression elasticities: | | | | | | |
| 1 day % | 100 | 410.1 | 378.9 | 420.9 | 309.4 | 381.4 |
| N/mm2 | 4.46 | 18.29 | 16.9 | 18.77 | 13.8 | 17.01 |
| 7 days % | 100 | 223.3 | 209.3 | 213.7 | 207.6 | 218.6 |
| N/mm2 | 19.65 | 43.87 | 41.13 | 41.99 | 40.79 | 42.96 |
| 21 days % | 100 | 194.0 | 196.7 | 195.9 | 188.1 | 190.0 |
| N/mm2 | 25.32 | 49.12 | 49.81 | 49.61 | 47.62 | 48.10 |
| 35 days % | 100 | 189.5 | 187.8 | 191.1 | 177.5 | 179.6 |
| N/mm2 | 27.73 | 52.59 | 52.08 | 53.0 | 49.21 | 49.79 |

What is claimed is:

1. A method of increasing the quality of building materials by incorporating therein a highly concentrated aqueous solution of low viscosity of melamine-/aldehyde resins, prepared by reacting to a precondensate in a first step melamine and an aldehyde in an alkaline medium and in the presence of water together with at least one compound (I) selected from the group consisting of an alkali sulfite, an alkaline earth sulfite, an amino sulfonic acid, an amino carboxylic acid, a hydroxycarboxylic acid, a hydroxycarboxylic acid lactone, and a polyhydroxy carboxylic acid lactone then reacting the thus obtained mixture in a second step with at least one compound (II) selected from the group consisting of an amino carboxylic acid, a carboxylic acid, a hydroxy carboxylic acid, a hydroxy carboxylic acid lactone, an amino sulfonic acid including sulfamic acid, a polyhydroxy carboxylic acid and a polyhydroxy carboxylic acid lactone, and then making alkaline the obtained resin solution by adding at least one basic compound (III), said building materials consisting of inorganic binders and additives, in an amount of from 0.01 to 25% by weight, relative to the inorganic binder.

2. The method according to claim 1, wherein in the preparation of the resin solution, the melamine, the aldehyde and the compound (I) are used in the first step in a molar ratio from 1:3.5 to 6:0.5 to 1.

3. The method according to claim 2, wherein in the preparation of the resin solution, the first step is realized at a pH value from 9.0 to 13.0.

4. The method according to claim 3, wherein in the preparation of the resin solution the first step is realized at a temperature from 75° C. to 100° C.

5. The method according to claim 4, wherein in the preparation of the resin solution the second step, the precondensate from the first step and the compound (II) are used in a molar ratio from 1:0.1 to 3, relative to the melamine used in the first step.

6. The method according to claim 5, wherein in the preparation of the resin solution the second step is realized at a pH value from 5.5 to 7.0.

7. The method according to claim 6, wherein in the preparation of the resin solution the second step is realized at a temperature from 75° C. to 100° C.

8. The method according to claim 7, wherein in the preparation of the resin solution, a compound as basic compound (III) is used which selected from the group consisting of an alkali hydroxide, an alkaline earth oxide, an alkaline earth hydroxide, ammonium hydroxide, a monoamine, a polyamine, a monoethonal amine, diethanol amine, triethanol amine and a basic compound of a transition metal.

9. The method according to claim 8, wherein in the preparation of the resin solution a basic alumina- or zinc-compound is used as basic compound (III).

10. The method according to claim 9, wherein in the preparation of the resin solution aqueous resin solutions are prepared having a solids content from 30 to 50% by weight and a viscosity from 5 to 250 centipoise.

11. The method according to claim 10, wherein in the preparation of the resin solution the aldehyde is formaldehyde.

12. The method according to claim 1 wherein in the preparation of the resin solution, the first step is realized at a pH of 9.0 to 13.0.

13. The method according to claim 1, wherein in the preparation of the resin solution the first step is realized at a temperature from 75° C. to 100° C.

14. The method according to claim 1, wherein in the preparation of the resin solution the second step, the precondensate from the first step and the compound (II) are used in a molar ratio from 1:0.1 to 3, relative to the melamine used in the first step.

15. The method according to claim 1, wherein in the preparation of the resin solution the second step is realized at a pH value from 5.5 to 7.0.

16. The method according to claim 1, wherein in the preparation of the resin solution the second step is realized at a temperature from 75° C. to 100° C.

17. The method according to claim 1, wherein in the preparation of the resin solution a compound as basic compound (III) is used, selected from the group, consisting of an alkali hydroxide, an alkaline earth oxide, an alkaline earth hydroxide, ammonium hydroxide, a monoamine, a polyamine, monoethanol amine, diethanol amine, triethanol amine and a basic compound of a transition metal.

18. The method according to claim 1, wherein in the preparation of the resin solution a basic alumina- or zinc-compound is used as basic compound (III).

19. The method according to claim 1, wherein in the preparation of the resin solution aqueous resin solutions are prepared having a solids content from 30 to 50% by weight and a viscosity from 5 to 250 centipoise.

20. The method according to claim 1, wherein in the preparation of the resin solution the aldehyde is formaldehyde.

21. The method according to claim 1 characterized in that the melamine/aldehyde resin solutions are used as a mixture with air entrained agents, liquefying agents, setting accelerators and setting inhibitors.

* * * * *